Dec. 22, 1942.  E. GEISS  2,306,211
GRADING APPARATUS
Filed June 17, 1941
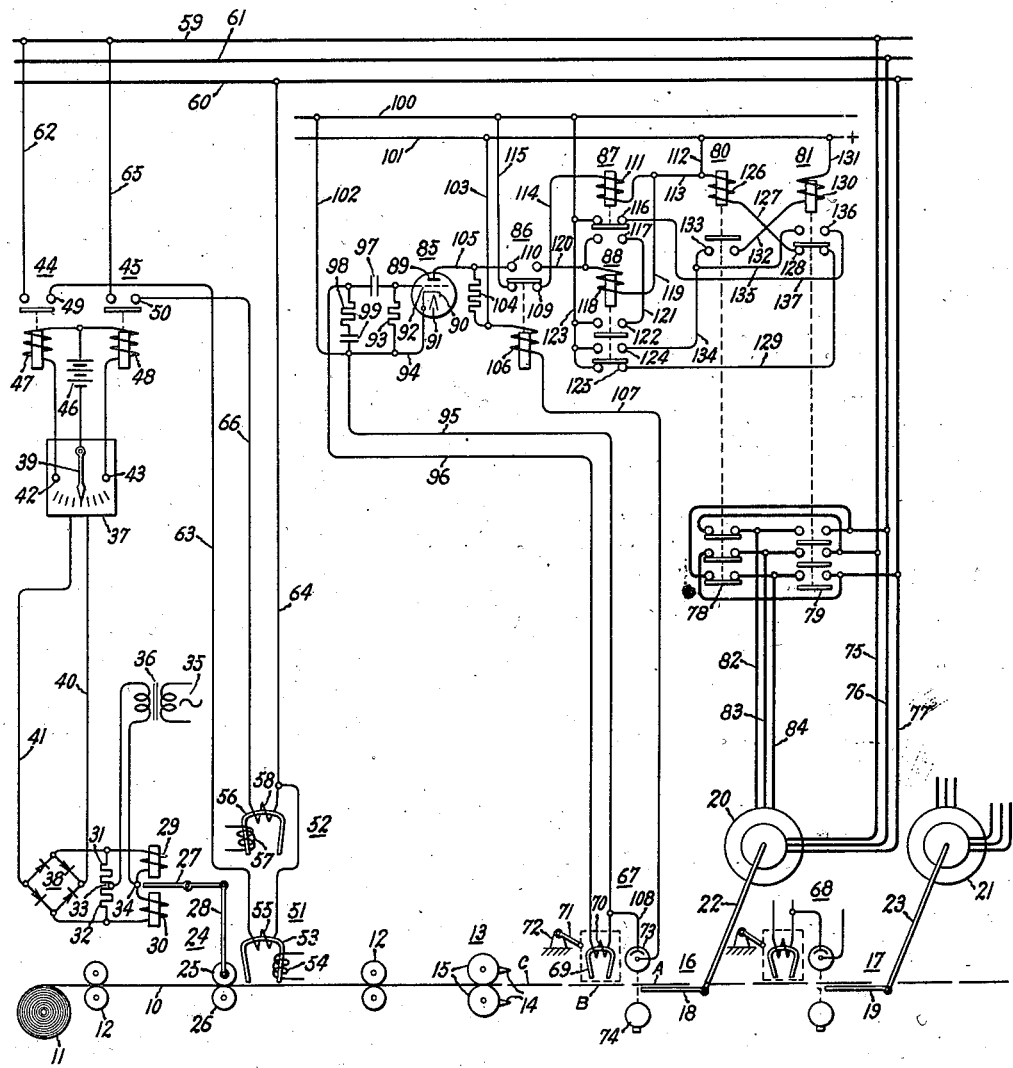
Inventor:
Eugen Geiss,
by Harry E. Dunlany
His Attorney.

Patented Dec. 22, 1942

2,306,211

UNITED STATES PATENT OFFICE 2,306,211

GRADING APPARATUS

Eugen Geiss, Berlin-Charlottenburg, Germany, assignor to General Electric Company, a corporation of New York Application June 17, 1941, Serial No. 398,503
In Germany May 18, 1940

8 Claims. (Cl. 209—82)

My invention relates to a grading apparatus, and although not limited thereto it has application to an apparatus for classifying metal sheets according to their gage as they are sheared from strip.

In automatic testing and grading devices for rolled plates, the steel strip from which the plates are cut is usually tested by means of a thickness gage and is then cut into plates, and a steering device or switch which is controlled by the thickness gage eliminates those plates the thickness of which deviates from a prescribed thickness. The thickness gage is usually placed ahead of the shears in the sense of the rolling process or movement of the strip, since to place it to gage the individual plates after they have been sheared is impractical. Since the thickness gage and the sorting or deviating device for eliminating the plate with the incorrect thickness are placed comparatively far apart from each other, the plates will take a relatively long time to travel the distance between the measuring instrument and the deviation devices. In arrangements employed in the prior art, the deviating devices are controlled by the measuring apparatus through a time delay system which must necessarily operate very accurately in order that the correct deviating device may be opened at the right moment or closed at the right time. Since the speed of travel of the sheared plates may vary, when a time delay mechanism is employed, additional means must be employed for changing the constants of the time delay devices as a function of the rolling speed.

It is, therefore, an object of my invention to provide an improved arrangement for classifying metal sheets according to their gage.

Another object of my invention is to provide an improved device for classifying metal sheets which will deviate the sheets the thickness of which is in excess of the required thickness at one station, and which will deviate the sheets the thickness of which is under the normal or required thickness at another discharge station.

A further object of my invention is to provide an improved apparatus for controlling the movement of strip material in response to its thickness.

A still further object of my invention is to provide an improved grading apparatus.

Further objects and advantages of my invention will become apparent from the following description referring to the accompanying drawing, and the features of novelty which characterize my invention will be pointed out with particularity in the claims annexed to and forming a part of this specification.

In the drawing the single figure illustrates a system for classifying metal sheets according to their thickness as they are sheared from strip, which system is provided with an embodiment of my invention.

In the arrangement illustrated in the drawing, I have provided a grading apparatus which includes an arrangement for measuring the thickness of a strip material and for producing a magnetic impression on any portion thereof the thickness of which deviates from a predetermined normal thickness. A trap is provided the operation of which is controlled in response to the presence or absence of the magnetic impression in order to deviate the sheet which has the non-normal thickness.

Referring more particularly to the drawing, I have illustrated my invention as applied to the grading of sheets or plates as they are cut from a strip material 10 as it is unwound from a reel 11. A plurality of power driven rolls 12 may be provided for moving the strip material 10 towards a suitable shearing mechanism indicated generally by the numeral 13. In the arrangement illustrated in the drawing the shearing mechanism includes a pair of knives 14 which are mounted on a pair of rolls 15. These rolls may be power driven and as the knives 14 are forced against the strip, the strip is cut. By controlling the movement of the shears the strip may be cut into sections or plates of any suitable lengths. The sheets are then moved along by any suitable arrangement, such as a power driven conveyor, power driven rollers or movable belt to a suitable stacking machine, not shown. On the conveyor before the sheets reach the stacking machine, I have provided a pair of traps indicated generally by the numerals 16 and 17 which are operated by my improved control device so that the rolled plates which have a non-normal thickness may be removed in order that only the plates with the proper thickness may reach the stacking machine. The traps 16 and 17 or deviating devices may be of any suitable construction and in the arrangement illustrated in the drawing, they are shown as movable door arrangements 18 and 19 which are operated by motors 20 and 21 through suitable linkage arrangements 22 and 23 respectively. The trap 16 operates when a plate has deviated the normal thickness in a one direction, such as being too thin, while the trap 17 will operate if the plate thickness has become in excess of a predetermined or normal thickness.

It is to be understood, however, that if desired only a single trap mechanism need be employed for removing the sheets the thickness of which is either above or below the normal thickness, without selectively removing the sheets as may be done by the control device illustrated.

In order that the traps 16 and 17 may be controlled in response to the deviation in thickness of the strip material 10 from a predetermined or normal thickness, I provide a suitable gage device indicated generally by the numeral 24 for continuously gaging the strip material 10. The gaging device 24 may be of any suitable type and in the arrangement illustrated in the drawing it is diagrammatically shown as a pair of rollers 25 and 26, the roller 26 being mounted below the band in fixed bearings, while the roller 25 is mounted above the band on movable bearings. These measuring rollers are continuously pressed against the material, and the motion of the upper measuring roll with respect to the lower measuring roll represents the change in thickness of the strip material above or below a predetermined normal thickness. This motion of the upper roll may be transmitted to a suitable control system in any suitable manner, and in the arrangement illustrated in the drawing the roll 25 is connected to an armature 27 of a gage head through a suitable linkage mechanism 28. The armature 27 is relatively movable with respect to a pair of gage coils 29 and 30 which have cores stationarily mounted with respect to the armature so that movement of the armature will change the air gaps therebetween. The gage coils 29 and 30 are connected in any suitable conventional bridge circuit having balancing arms 31 and 32. The bridge circuit is energized at conjugate points 33 and 34 from a suitable source of supply indicated by the numeral 35, through a suitable transformer 36. The opposite conjugate points are connected to a suitable responsive meter 37 through a rectifying device 38. The meter 37 includes a micro-ammeter which has a movable contact 39, the movement of which is responsive to the current which flows from the bridge circuit to the ammeter through the lines 40 and 41. The ammeter is also provided with stationary contacts 42 and 43. A pair of relays 44 and 45 are provided the operating coils of which are selectively energized when the movable contact 39 contacts the stationary contacts 42 or 43. A suitable source of supply 46, such as a battery may be connected to the movable contact 39 and to operating coils 47 and 48 of the relays 44 and 45, respectively. The relay operating coil 47 is also connected to the contact 42 while the coil 48 is connected to the contact 43. It will, therefore, be seen that when the movable contact 39 contacts the contact 42, the relay coil 47 will be energized to close contacts 49 of the relay 44. Conversely, if the contact arm 39 cooperates with the contact 43, contacts 50 of the relay 45 will be closed. The measuring gage circuit is so adjusted that the operating arm 39 is in a zero or neutral position when the measuring rolls 25 and 26 are at a distance from each other which corresponds with the desired or normal thickness of the strip material 10. When the material is in excess the arm 39 will contact 43, while when the material is too thin the arm will contact 42.

In order to produce a suitable electrical impression on the strip material when any portion deviates a predetermined amount from a suitable normal thickness, which impression will in turn cause a suitable control device to operate a deviating mechanism, I provide suitable electromagnetic devices indicated generally by the numerals 51 and 52 for producing a suitable magnetic impression on the strip device on the portion of which deviates from the normal thickness. The electromagnet 51 includes a core 53, a coil 54 which may be energized from any suitable source of direct current, and a coil 55 which may be energized from any suitable source of alternating current when one of the relays, such as 44 is energized. The electromagnet or magnet head 52 is similarly provided with a core 56, a coil 57 which is suitable energized from a direct current source and an alternating current coil 58 which is connected to a source of alternating current when the relay 45 is energized. The direct current coils 54 and 57 are constantly energized from the direct current source whenever the gaging apparatus is in operation, in order to secure a constant magnetization condition in that portion of the material which passes under these heads. For clarity sake the rolls 25 and 26 and the gage head 51 and 52 has been shown as longitudinally disposed. However, in an actual installation the measuring rolls and both the magnetic heads 51 and 52 may be placed side by side or along the lateral axis of the strip material 10, or along an axis perpendicular to its longitudinal axis or direction of movement. It will, therefore, be seen that the two magnet heads 51 and 52 will produce tracks of magnetization on the strip, each track being parallel with the longitudinal axis of the strip, or in the arrangement illustrated in the drawing parallel with the direction of movement thereof. Thus, when the gage determines that the thickness of any portion of the strip is too small by a predetermined amount, the relay 44 will be energized and will close the contacts 49 in order to connect the coil 55 across a suitable alternating current source, which in the drawing includes lines 59 and 60 of a three phase source which may be connected to lines 59, 60 and 61. The circuit may be traced from the line 59 to conductor 62, contacts 49, conductor 63, coil 55, and conductor 64 to line 60. The energizing of the coil 55 will produce a pulsating magnetization characteristic which is superimposed upon the direct current magnetization. In this manner I produce a varying or pulsating magnetic impression which may be in turn employed to control a suitable control device which will be described below. When the gage device 24 moves upon the material 10 at any particular portion being in excess of the predetermined normal thickness, the relay 45 will close its contacts 50 and energize the coil 58 to the circuit which may be traced from the line 59, conductor 65, contacts 50, conductor 66, coil 58, conductor 64, back to the line 60. This will produce a pulsating flux laterally spaced from the flux produced by the magnet head 51. This pulsating flux may in turn be employed to actuate a suitable control device which will be described below. Of course, it is to be understood that since the rolls 25 and 26 and the gage heads 51 and 52 are in alignment in a lateral direction the coils 55 and 56 will not be simultaneously energized.

In order to provide devices which may be responsive to the magnetic impressions which are put on any portion of the strip which deviates from the normal thickness, I provide suitable scanning devices 67 and 68. The scanning device 67 includes a suitable core 69 and coil 70. The core 69 and coil 70 may be mounted in a small carriage or coaster so that the ends of the core may be disposed relatively close to the strip material so that the ends will be cut by the flux which is produced on the strip material by the head 51. The scanning head 67 may be prevented from moving with the sheets by means of a lever arm 71 which is connected to the scanning device and to a stationary support 72. The scanning head 67 is also mounted for vertical movement so as to take care of any irregularity in the plates and it may also be adjusted so as to prevent it from moving any closer than a suitable minimum distance to the plates. The distance between the scanning head 67 and the deviating trap 16 may be approximately equal to the length of a plate section so as to permit a reliable grading of even such plates the thickness of which is incorrect only within the last part of the plate or shortly before its rear edge. The traps 16 and 17 may be placed any suitable distance apart and the scanning head 68 is similarly constructed as 67, and is also placed a similar distance in front of its trap 17. In addition to be longitudinally disposed the scanning heads 67 and 68 are also laterally disposed the same amount that the electromagnets 51 and 52 are disposed. Thus, the scanning device 67 is so disposed with respect to the plates that the ends of the cores 69 will cut the flux which is produced by the gage head 51. Also the scanning head 68 is so disposed with respect to the plate that it will cut the flux produced by the electromagnet 52. Thus, if the conveyor for moving the plates is run straight out from the shearing device and gage, it will be seen that the scanning head 67 will be in alignment with the electromagnet 51 while the scanning head 68 will be in alignment with the electromagnet 52. The scanning head 67 cooperates with a suitable control system for operating the motor 20 to open the trap 16 whenever any plate has a thickness which is less than a predetermined thickness, and the scanning head 68 cooperates with a suitable control system for operating the motor 21 for opening the trap 17 whenever any plate has a thickness in excess of a predetermined amount. The control system for operating the motor 21 is similar to that which is employed to operate the motor 20 so only one is illustrated in the drawing and it will now be described.

The scanning head 67 operates to control the motor 20 in cooperation with a photoelectric cell 73 which is made conductive when a source of light 74 shines on the cathode thereof. The light source and photoelectric cell are placed on opposite sides of the path of movement of the plates so that the cell 73 will be made conductive during the interval of time when the rear end of one plate has passed by a predetermined point or out of the beam of light and until the front end of the next succeeding plate comes to that predetermined point and covers the light source. Thus, when there is a plate preventing the light source 74 from shining on the photoelectric tube 73, it will be nonconductive and between the time one plate moves out of the path of light and until the next plate moves into the path of light the tube 73 will be made conducting.

The motor 20 for operating the trap 16 may be of any suitable type and in the arrangement illustrated in the drawing it includes a three phase alternating current dynamo-electric machine, the rotor of which is connected across the three phase source of supply lines 59, 60, and 61 through conductors 75, 76 and 77. The stator is also adapted to be connected across the same three phase line 59, 60, and 61 through movable contacts 78 and 79 of relays 80 and 81, respectively. Thus, when the contacts 78 are closed the stator is connected through conductors 82, 83, and 84 and the contacts 78 in such a manner that the rotating field produced in the stator will be in phase with the rotating field produced in the rotor so that the rotor will assume a predetermined position with respect to the stator and no relatively rotation will be produced therebetween. With the contacts 78 of the relay 80 closed the motor is stationary and the trap 16 is closed. However, when the relay 80 is deenergized and its contacts 78 opened and the relay 81 is energized with its contacts 79 closed, the stator will be connected across the source of supply through the conductors 82, 83, 84 and the contact 79 in such a manner with respect to the rotor that a rotating field will be set up relative to the rotor so a torque is produced to rotate the rotor in such a direction so as to open the trap 16. When the trap opens the rotor will have moved sufficiently that the fields are again in phase. When the relay 81 is again deenergized so that the contacts 79 are open and the relay 80 is energized so that its contacts 78 are closed, a rotating field will be set up in the motor in an opposite direction which will cause the rotor to move in an opposite direction until the trap is again closed when the rotating fields in the rotor and stator are again in synchronism or in phase, and the rotor will again be held in this position. Thus, with the plates having a normal thickness the motor will be held in the closed position and the relay 80 will be energized and its contacts 78 closed through the control circuit which will now be described, while if the scanning head 67 finds a pulsating magnetic force which indicates that the thickness is too thin it will cooperate with the photoelectric cell to open the relay 80 and close the relay 81 at a predetermined time with respect to the movement of the non-normal plate and hold the relays in this position for a sufficient length of time so that the non-normal plate may be deviated through the open trap 16. In like manner if the scanning head 68 cuts a pulsating flux it will cooperate with its photoelectric cell to operate the motor 21. The scanning heads, however, will not be operated by the unidirectional flux.

The circuit through which the scanning head 67 and photoelectric cell 73 controls the operation of the motor relays 80 and 81 includes an electric discharge device indicated by the numeral 85, a relay 86 the operation of which is controlled by the photoelectric cell 73, a relay 87 the operation of which is controlled by the relay 86 and, a relay 88 which is energized when the tube 85 is made conductive and the relay 86 is energized.

The electric discharge device 85 may be of any suitable type and includes an anode 89, a cathode 90 which may be heated by a suitable heater 91 which may be energized from a suitable source of power in a conventional manner, and a control electrode 92. The control electrode 92 is connected to the cathode 90 through a resistor 93 and a conductor 94 and this conductor is in turn connected to one side of the coil 70 of the scanning head 67 through a conductor 95. The other side of the coil 70 is connected to the control electrode 92 through a conductor 96 and a capacitor 97. The capacitor 97 and resistor 93 are shunted by a resistor 98 and a capacitor 99. The cathode 90 is connected to the negative side of a suitable source of power indicated by the lines 100 and 101, through conductor 94, and a conductor 102. Thus when no current is flowing through the coil 70 the potential on the control electrode will remain sufficiently negative so as to prevent the tube from firing. However, the constants of the circuit which is connected between the cathode and control electrode are so proportioned that upon a current flowing through the coil 70 which is produced by the core 69 of the gage head 67 cutting the pulsating flux on a portion of a sheet, the potential of the control electrode 92 will be raised a sufficient amount with respect to the potential of the cathode 90 so that current may be allowed to flow between the anode 89 and the cathode 90. The anode 89 is connected to the positive line 101 through a conductor 103, a resistor 104 and conductor 105. The relay 86 is energized through its operating coil 106 when the photoelectric tube 73 is made conductive. The operating circuit for the coil 106 may be traced from the positive side of the D.-C. source 101, conductor 103, coil 106, a conductor 107, to the anode of the photoelectric cell through the cell to the cathode, conductor 108, and conductor 95 and 102 to line 100. The relay 106 has contacts 109 which are closed when the relay is deenergized and contacts 110 which close when the operating coil 106 is energized. The contacts 109 are connected in circuit with an operating coil 111 of the relay 87, and this circuit may be traced from the line 101, conductors 112, 113, coil 111, conductor 114, contacts 109 and a conductor 115 to the line 100. Thus relay 87 is normally energized when relay 86 is deenergized and the relay 87 has contacts 116 which are closed when the relay is energized and contacts 117 which are closed when the relay is deenergized. Contacts 116 are provided in a holding circuit for the relay 81 and the contacts 117 are provided in a holding circuit for an energizing coil 118 for the relay 88. The energizing circuit for the operating coil 118 for the relay 88 may be traced from the line 101, conductors 112, 113, a conductor 119, coil 118, conductor 120, the contacts 110 which are closed when the relay 86 is energized, the electric discharge tube 85, and the conductor 102 to the line 100. The holding circuit for the coil 118 which is independent of the discharge device 85 may be traced through the contacts 117 which are closed when the relay 87 is deenergized, a conductor 121, contacts 122 of the relay 88 which are closed when the relay is energized, and a conductor 123 to the line 100. The relay 88 is also provided with contacts 124 which also close when the relay 88 is energized and contacts 125 which are closed when the relay is deenergized. The latter contacts are in circuit with an energizing coil 126 of the motor relay 80, and this circuit may be traced from the line 101, conductor 112, relay operating coil 126, a conductor 127, contacts 128 of the relay 81, these contacts being closed when the latter relay is deenergized, a conductor 129, contact 125 and a conductor 123 to the line 100. The actuating circuit for the motor relay 81 includes an operating coil 130, one side of which is connected to the line 101 through a conductor 131, conductor 132, contacts 133 which are on the relay 80 and which are closed when the relay is deenergized, conductor 134, contacts 124 which close when the relay 88 is energized, and conductor 123 to the line 100. A holding circuit for the relay 81 independent of the relay 88 is provided which includes the contacts 133 of the relay 80, a conductor 135, contact 136 of the relay 81 which are closed when the relay is energized, a conductor 137, contacts 116 of the relay 87 which are closed when the relay is energized, and conductor 123 to the line 100.

The operation of my improved gaging apparatus will now be described. Let us assume that a correct plate A occupies at a predetermined moment a position on the trap 16 in such a way that it covers the light source so that it cannot shine on the photoelectric cell 73. Let us also assume that a plate B is passing under the scanning device 67. Let us also assume that at any suitable portion of the plate B was gaged to be too thin so that a pulsating magnetization characteristic was impressed at that portion of the plate B. When this portion comes under the scanning head 67 the two ends of the core 69 will be electrodynamically affected by this pulsating magnetization force, or a field of varying intensity will be cut by the core so as to induce a current in the coil 70. It is to be assumed that no current will be induced in the coil 70 when the core 69 is being cut by a field of constant intensity. The current flow through the coil 70 will raise the potential of the control electrode 92 above the cathode 90 so that the tube or electric discharge device 85 will be made conducting. Current may immediately begin to flow from the positive line 101 through the resistor 104 and the tube to the negative line. Thus, the tube 85 will continue to pass current even though the remainder of the plate B is of correct dimensions so that the scanning head 67 will not cut any pulsating flux. As has already been brought out, when the trap 16 is in a closed position the relay 80 is energized through a circuit which includes the contact 125 of the relay 88 so that the armature of the motor 20 will be held in its stationary position. With the scanning head 67 having been affected by the pulsating flux on a portion of the plate B the tube 85 has been made conducting and when the plate A has moved so that its rear edge has just passed out of the path of light between the light source 74 and the photoelectric cell 73, the cell will be made conductive. Thus, when the photoelectric cell 73 is made conductive at the same time that the tube 85 is conductive the relay 80 will be deenergized and the relay 81 will be energized so as to so connect the stator of the motor 20 so that a rotating field will be present in order to cause it to rotate and move the trap 16 to an open position. It is to be understood that the light source and photoelectric cell are so placed relative to the trap that when the plate A moves out of the path of the light source, it will have also moved a sufficient amount off the trap 16 so that it will not be deviated by the trap when it opens but will pass along to be scanned by the scanner 68.

With the trap 16 having been opened the plate B will be deviated from the normal path of movement along the conveyor or belt to a station which receives the plates, any portion of which are too thin. The circuits for accomplishing the deenergization of the relay 80 and the energization of the relay 81 will now be traced. The photoelectric cell 73 having been made conductive completes the circuit for energizing the coil 106 of the relay 86 so that its normally closed contacts 109 will be opened and its contacts 110 closed. The opening of the contacts 109 will deenergize the relay 87 the function of which will become apparent as this description proceeds. With the contacts 110 closed and the tube 85 made conducting a circuit will be completed for energizing the relay 88. This circuit may be traced from the line 101, conductors 112, 113, and 119, coil 118, conductor 120, contacts 110, conductor 105, tube 85, conductors 94 and 102 to the line 100. The energization of relay 88 opens its contacts 125 which deenergizes the relay 80, the energizing circuit for the relay 80 being from the line 101, coil 126, contact 128 through the contacts 125 to the line 100. The energization of the relay 88 also closes contacts 124 which with contacts 133 of the relay 80 closes the energizing circuit for the relay 81. This circuit may be traced from the line 101, conductor 131, energizing coil 130, conductor 132, contacts 133, conductor 134, contacts 124, conductor 123 to the line 100. At the same time the contacts 122 close a holding circuit for the relay 88 which is independent of the tube 85. This circuit may be traced from the line 101, conductors 112, 113, and 119, coil 118, contacts 117 on the relay 87 which contacts are closed since the relay 87 has been deenergized by the movement of the relay 86 to an energized position, conductor 121, contacts 122, conductor 123, to the line 100. The same contacts 122 which complete the holding circuit for the relay 88 also connect the anode of the tube 85 to the negative side of the line in order to deenergize the tube. This circuit may be traced from the line 100, conductor 123, contacts 122, conductor 121, contacts 117, conductor 120, contacts 110 which are closed since the relay 86 is energized, to the anode 89. This will prepare the tube to again be energized whenever a pulsating field is found on another plate.

When the plate B moves on to the trap so that its front end passes across the path of the light source to the photoelectric cell 73, the cell will be made non-conductive and the relay 86 will be deenergized, so that its contacts 110 will be opened and its contacts 109 closed. The closing of contacts 109 will again energize the relay 87 which will cause its contacts 117 to open and its contacts 116 to close. The opening of the contacts 117 will break the holding circuit for the relay 88 and cause it to move to its deenergized position which will cause its contacts 124 to open so as to disconnect the circuit including these contacts from the operating coil 130 of the relay 81. The relay 81, however, will not drop out since the moving of the relay 87 to a circuit closing position closes its contacts 116 which closes a second holding circuit for the relay 81, which may be traced from the line 101, conductor 131, coil 130, conductor 132, contacts 133, conductor 135, contacts 136 which are closed since the relay 81 is energized, conductor 137, contacts 116, conductor 123 to the line 100. Thus, so long as the plate B remains between the light source 74 and the photoelectric cell 73 the relay 81 will remain energized through the last traced circuit. During the time the plate B is moving into the trap 16 so as to be deviated thereby, a plate C will be scanned by the scanner 67, and let us assume that the plate C has a normal thickness so that it will not energize the scanner. Therefore, when the plate B moves out of the path of the light source the relay 86 will become energized which will open the contacts 109 and close the contacts 110. The opening of the contacts 109 will deenergize the relay 87 which opens the contacts 116 which opens the holding circuit for the relay 81. Since current cannot flow through the tube 85, the relay 88 will not be energized and with the relay 81 being deenergized the energizing circuit for the coil 126 of the relay 80 is again closed through the contacts 128 and the contacts 125 of the relay 88. This causes the armature of the motor to move so as to close the trap 16. If, however, the plate C had had a portion which was too thin the scanning device would have energized the tube 85 so that another circuit including the contacts 124 of the relay 88 so that the relay 81 would have remained energized.

In view of the foregoing, it will be seen that I have provided an improved grading apparatus for gaging strip material before it is cut into sheets and for producing a magnetic impression on any portion thereof which deviates from a predetermined normal thickness. Furthermore by providing a control circuit responsive to these magnetic impressions, I am able to control deviating traps for controlling the destination of the sheets, the thickness of which deviates from the normal thickness. Instead of producing a magnetic impression on one track if the thickness is too thin and on another track laterally spaced if the thickness is too thick, I may apply only a single measuring head for magnetizing the strip with coils, one of which would be energized by a pulsating source of one frequency if the strip were too thin, and the other would be energized from a source of a different frequency if the strip were too thick. If desired, only one coil need be employed which could be selectively connected to the different sources. If magnetic impressions of different frequency were employed, the scanning devices could be employed and with suitably designed filter circuits the electric discharge device could be energized whenever the frequency coordinated with them would occur. Thus, the scanning heads 67 and 68 could be in longitudinal alignment so that if one frequency were present the scanning head 67 would energize its tube 85 while if a different frequency were present the scanning head 68 would energize its tube so as to control the operation of the motor 21. It is also to be understood that instead of producing two magnetic impressions on the strip for under and over thickness, I may produce any suitable number of impressions on the strip and with cooperating heads and deviating devices I may selectively remove the nonnormal sheets at several stations according to their gage. This would dispense with the sorting of the non-normal sheets. It is also to be understood that instead of impressing a magnetic impression on the strip when the thickness of which deviates from a normal thickness, any other suitable electrical impression may be placed on the strip, which impression may be employed to control a suitable scanning device.

Although I have shown and described particular embodiments of my invention, I do not desire to be limited to the particular embodiments described, and I intend in the appended claims to cover all modifications which do not depart from the spirit and scope of my invention.

What I claim as new and desire to secure by Letters Patent of the United States is:

1. In an apparatus for classifying metal sheets as they are sheared from strip, means for continuously magnetizing a strip of metal and for varying the magnetization of any portion the thickness of which deviates from a predetermined normal thickness, means for shearing the strip into sheets, and means responsive to the presence of said varied magnetization on a portion of any of the plates for deviating said non-normal sheets from said normal sheets.

2. In an apparatus for classifying metal sheets as they are sheared from strip, means for continuously magnetizing a strip of metal with a unidirectional flux and for superimposing a pulsating flux on said magnetized portion upon the thickness of that portion deviating from a predetermined normal thickness, means for shearing the strip into sheets, and means responsive to the pulsating character of said magnetization on a portion of any of the plates for deviating said non-normal sheets from said normal sheets.

3. In an apparatus for classifying metal sheets as they are sheared from strip, an electromagnet for continuously magnetizing said strip, said electromagnet being adapted to be continuously excited from a D.-C. source, means for continuously measuring the thickness of the strip and for connecting said electromagnet with an A.-C. source when the thickness deviates from a predetermined normal, and means responsive to the presence of the varying magnetization on a portion of any of the plates for deviating said non-normal plates.

4. In an apparatus for classifying metal sheets as they are sheared from strip, an electromagnet having a pair of coils, one of said coils being adapted to be connected to a D.-C. source for continuously magnetizing said strip, means for continuously measuring the thickness of said strip and for connecting said second coil to an A.-C. source when the thickness deviates from a predetermined normal, and means responsive to the presence of the alternating magnetic impression on a portion of any of the plates for deviating said non-normal plates.

5. In an apparatus for classifying continuously moving metal sheets as they are sheared from strip, a pair of electromagnets disposed to magnetize said strip in separate planes each being parallel to the direction of movement of said sheets, means for continuously measuring the thickness of said strip and for energizing one electromagnet if the thickness is in excess and for energizing the second of said electromagnets if the thickness is less than a predetermined normal thickness, and a pair of magnetic responsive means being disposed so that one is responsive to magnetic impressions produced by said first electromagnet and said second magnetic responsive means is responsive to magnetic impressions produced by said second electromagnet, and means being operative upon said first or said second magnetic responsive means being energized for distributing said sheared sheets to a plurality of discharge stations according to the gage of said sheets.

6. In an apparatus for classifying continuously moving metal sheets as they are sheared from strip, means for continuously measuring the strip and for producing a magnetic impression on a portion which deviates from a predetermined normal value, means disposed in the path of movement of said sheets and responsive to the presence of said magnetic impressions, means including an electric motor operative to deviate a non-normal sheet, a light source disposed to produce a ray of light across the path of movement of said sheets, a photoelectric cell operative upon said light shining on its cathode, and control means responsive to energization of said magnetic responsive means and said photoelectric cell for energizing said motor.

7. In an apparatus for classifying continuously moving metal sheets as they are sheared from strip, means for continuously measuring the strip and for producing a magnetic impression on a portion which deviates from a predetermined normal value, means disposed in the path of movement of said sheets and responsive to the presence of said magnetic impressions, a deviating trap, an electric motor operatively connected to said trap, a pair of motor relays adapted to be selectively energized to control the rotation of said motor to operate said trap to a deviating or a closed position, a light source disposed to produce a ray of light across the path of movement of said sheets, a photoelectric cell operative upon said light shining on its cathode, said light source and cell being so disposed with respect to said trap that the beam of light is uncovered upon the sheet in front of said non-normal sheet moving off said trap, and control means responsive to energization of said magnetic responsive means and said photoelectric cell for energizing one of said motor relays for rotating said motor to open said trap.

8. In an apparatus for classifying continuously moving metal sheets as they are sheared from strip, means for continuously measuring the strip and for producing a magnetic impression on a portion which deviates from a predetermined normal value, means disposed in the path of movement of said sheets and responsive to the presence of said magnetic impressions, an electric motor operatively connected to said trap, a pair of motor relays adapted to be selectively energized to control the rotation of said motor to operate said trap to a deviating or a closed position, a light source disposed to produce a ray of light across the path of movement of said sheets, a photoelectric cell operative upon said light shining on its cathode, said light source and cell being so disposed with respect to said trap that the beam of light is uncovered upon the sheet in front of said non-normal sheet moving off said trap, an electric discharge device adapted to be rendered conductive upon energization of said magnetic responsive means, a first relay adapted to be energized upon energization of said photoelectric cell, a second relay having contacts adapted to close a circuit to energize one of said motor relays to hold said trap closed when said second relay is deenergized, said first relay upon being energized being adapted to close contacts to energize said second relay to deenergize said first motor relay and energize said second motor relay to open said trap, said light source being covered to deenergize said cell and said first relay upon said non-normal sheet moving on said trap, and a third relay being adapted to be energized and have contacts closed when said first-mentioned relay is deenergized to provide a holding circuit for said second motor relay, said cell being operative when said non-normal sheet moves out of the path of said light source to cause said first relay to operate and deenergize said third relay to deenergize said second motor relay.

EUGEN GEISS.